April 8, 1958   C. W. KELSEY   2,829,723
TRACTOR WITH POWER TAKE-OFF AND IMPLEMENT COUPLING MEANS
Filed Feb. 12, 1954   2 Sheets-Sheet 1
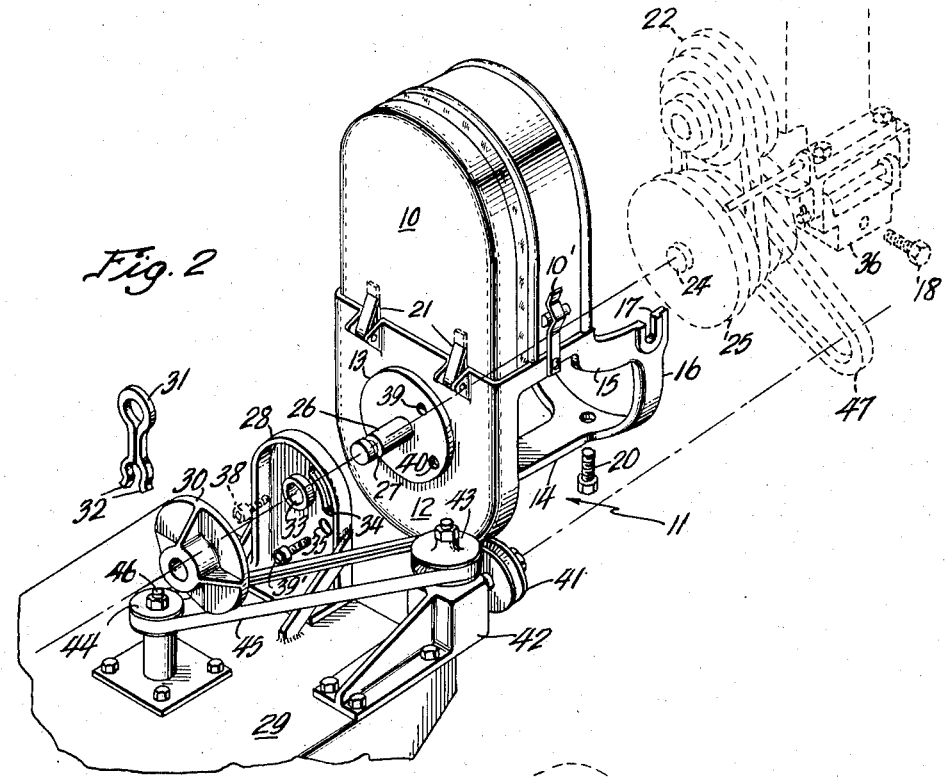
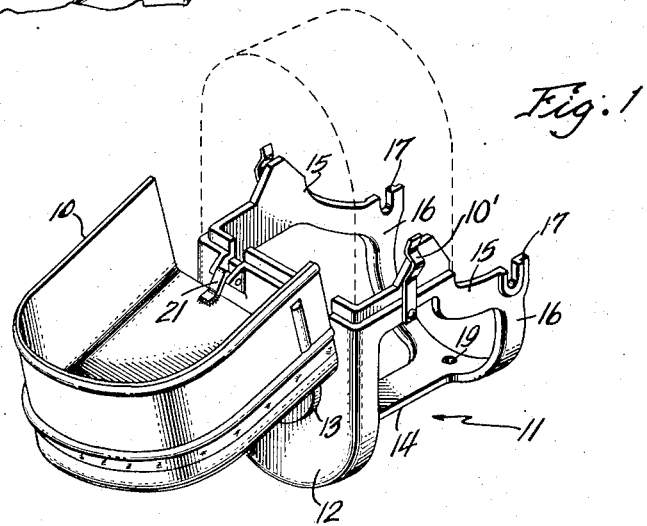
Inventor:
Cadwallader W. Kelsey,
by Andros and Smith
His Attorneys.

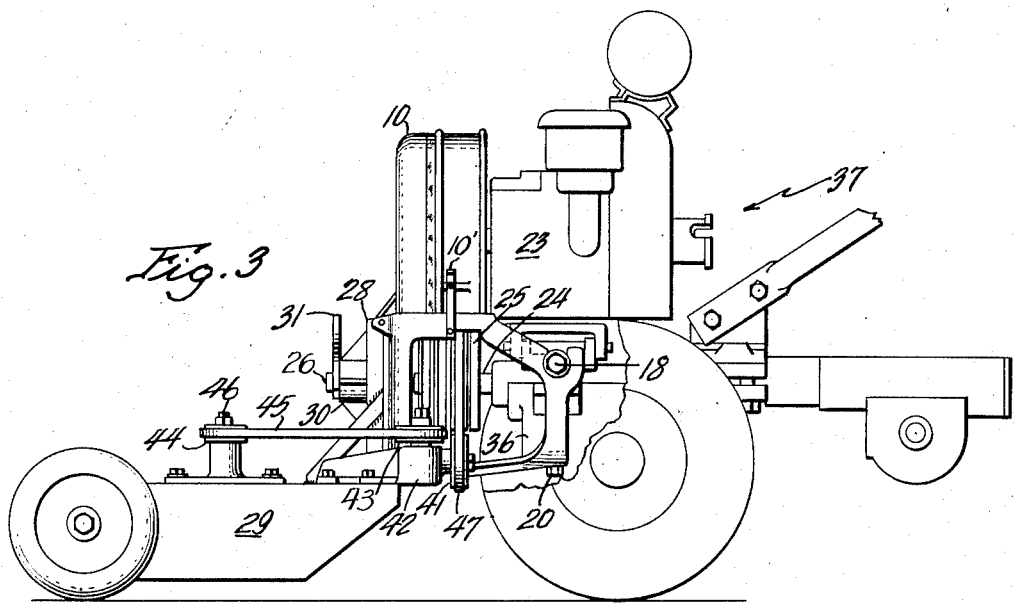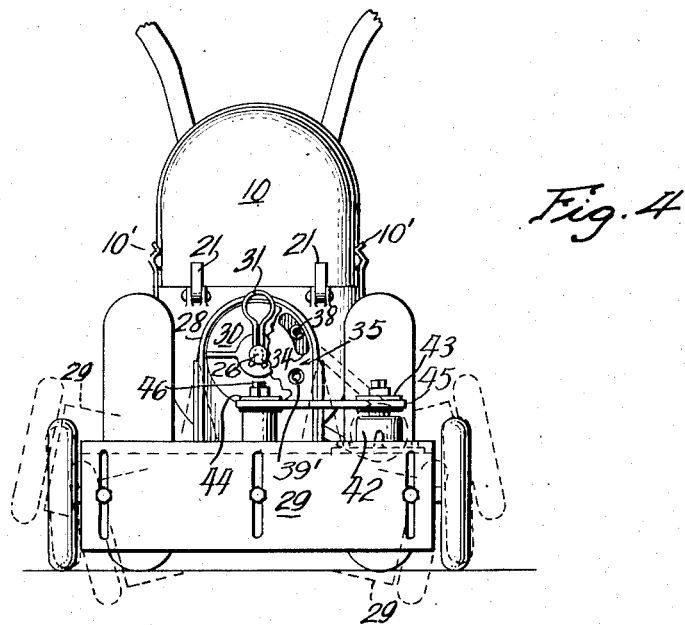

United States Patent Office 2,829,723
Patented Apr. 8, 1958

2,829,723

TRACTOR WITH POWER TAKE-OFF AND IMPLEMENT COUPLING MEANS

Cadwallader W. Kelsey, Troy, N. Y.

Application February 12, 1954, Serial No. 409,835

4 Claims. (Cl. 180—53)

This invention relates to improvements in garden tractors. More particularly, it pertains to a quick-change adapter frame secured to a tractor chassis for rapidly and interchangeably mounting thereon various types of tools powered by the tractor motor to operate in advance of the tractor, especially in a manner such that the tools will accommodate themselves to variations in ground contour, and the provision of such an arrangement is a principal object of the invention.

Many small garden tractors now on the market that are powered by gasoline motors are operated as individual units. That is to say, various types of long grass cutting equipment or field mowers, lawn mowers, snow plows, snow blowers, buck rakes, power barrows, and the like, even including electricity generating equipment, water-pumps, etc., are so constructed that each carries its own power plant. Such individual units are sold in substantial quantities and besides being initially expensive, are costly to operate and require large storage areas, especially on larger country estates. Attempts have been made, with no little degree of commercial success, to use a single gasoline powered tractor so constructed and arranged to mount such various types of power tools, but one of the chief difficulties and disadvantages resides in the fact that various supplemental individual attachments are necessary for mounting the same which have proven to be uneconomic and time consuming in making the necessary change-overs.

It has long been recognized by the industry that it would be a distinct improvement to overcome such difficulties and disadvantages, and this has now been accomplished by means of the present invention.

Generally, therefore, it is an object of the invention to provide a single quick-change adapter attachment for a garden tractor which will permit such various types of power tools to be interchangeably attached and removed in a matter of seconds, such attachment being sturdy and durable, yet simple in construction, economic of manufacture, and which will operate with relative freedom from wear and tear, as well as other mechanical difficulties.

Specifically, it is an object of the invention to provide a quick-change adapter device for a garden tractor having a power plant and a plurality of driving pulleys on a power take-off driving shaft comprising a frame to be rigidly secured to the chassis, and means on the frame in advance of the driving shaft, and in coaxial alignment therewith, interchangeably to receive and oscillatably to support any one of a plurality of power tools having a power take-off pulley on such tools and a belt connectable therewith to the driving pulleys, whereby the power tools can be operated in advance of the path of the tractor while following variations in ground contour without any variation in tension on the belt which at all times remains oscillatable with the tool.

More specifically, it is an object of the invention to provide such a garden tractor having a power plant and a plurality of driving pulleys on a power take-off driving shaft comprising the combination of a frame adapted rigidly to be secured to the chassis, means on the frame in advance of the driving shaft, and in coaxial alignment therewith to support a power tool, a power tool having a coupling rigidly connected thereto and pivotally mounted on such means oscillatably to support the tool and a driving pulley mounted on the tool for actuating the same, the pulley being driven by a belt connected to the power take-off.

Yet, more specifically, it is an object of the invention to provide a garden tractor, which comprises in combination, a power plant mounted on the chassis of the tractor; a power take-off driving shaft, having a plurality of driving pulleys thereon, cooperatively connected with the power plant and also being mounted on the chassis; a quick-change adapter frame mounted on the chassis; means on the frame in advance of the driving shaft, the center of which means is in coaxial alignment therewith, to support a power tool; a power tool; a coupling rigidly connected to the power tool and pivotally mounted on the means oscillatably to support the tool; and a driving pulley mounted on the tool for actuating the same, the pulley being driven by a belt connected to the power take-off; whereby the power tool can be operated in advance of the path of the tractor while accommodating itself to variations in ground contour without any variation in tension on said belt which will at all times remain oscillatable with the tool.

Other objects of the invention will in part be obvious and will in part appear hereinafter.

The invention accordingly comprises the features of construction, combination of elements, and arrangement of parts, which will be exemplified in the construction hereinafter set forth and the scope of the application of which will be indicated in the claims.

For a fuller understanding of the nature and objects of the invention reference should be had to the following detailed description taken in connection with the accompanying drawings, in which:

Fig. 1 is a perspective view illustrating a preferred embodiment of the quick-change adapter housing frame with a portion of the housing in lowered position;

Fig. 2 is an exploded perspective view illustrating the same quick-change adapter housing frame in a closed position, a portion of a driving shaft, pulleys and chassis in dotted line position, and a fragmentary portion of a form of power tool;

Fig. 3 is a side elevational view, with parts broken away, of a garden type of tractor illustrating the quick-change adapter attachment in assembled relation thereon and carrying a power tool in advance thereof; and Fig. 4 is a front elevational view of Fig. 3, with parts broken away, illustrating in dotted line position the oscillatable or pivotal movement of the power tool as it accommodates itself to variations in ground contour while being operated in advance of the tractor.

Referring now more particularly to the drawings, there is shown in Fig. 1 a preferred form of quick-change adapter housing frame attachment consisting of an upper section 10 and a lower section indicated generally at 11. The lower section consists of a front panel 12 on the face of which is an off-set hub portion 13. Rearwardly extending from the face panel 12 is a yoke portion consisting of a lower frame section 14, side frame sections 15 and a curved rear U-shaped section 16 which terminates in lug portions 17 adapting the same securely to be attached to the chassis of the tractor by means of machine screws 18. A hole 19 in the bottom of the U-shaped frame is adapted to receive a machine screw 20 also for purposes of attachment to the chassis. The section 10 is pivotally mounted to the section 12 by hinges 21 and when so mounted on the chassis adapted to house the change-speed driving pulleys 22 of the motor 23, the power take-off shaft 24 and driving pulleys 25 mounted thereon. (See Figs. 2 and 3.) The pulley housing section 10 is held in position by suitable side spring clips 10'.

An important feature of the invention is the means for oscillatably supporting any one of the power tools adapted for such a tractor, and it is essential that the center of such means be in coaxial alignment with the power take-off shaft 24. Preferably, I employ a stud shaft 26 for the purpose, rigidly projecting from the front section 12 of the quick-change adapter frame and this stud shaft is in coaxial alignment with the power take-off shaft 24. Adjacent the outer end of the shaft 26 is an annular groove 27 and the shaft is of a length to accommodate a coupling 28 on a power tool 29 in addition to a sleeve locking member 30 for the coupling, which locking member fits on the shaft inwardly of the groove 27, and a clip-on locking element for the member 30 in the form of a bifurcated type of cotter pin 31, the bifurcated ends 32 of which clip into the annular groove 27.

It will be observed that the coupling 28 on the power tool 29 has an opening 33 therein to be received by the stud shaft 26. Adjacent the opening 33 is an arcuate slot 34 and preferably, on the same diameter, adjacent one end of the slot 34, is an opening 35. All power tools adapted for use in conjunction with my invention may be provided with such couplings. When the quick-change adapter attachment is secured to the chassis 36 of the tractor, indicated generally at 37, by means of the machine screws 18 and 20, the same is ready interchangeably to receive any one of a number of such power tools of the type above mentioned. The locking members 30 and 31 which are normally carried on the stud shaft 26 when no power tool is being carried thereby, such as, for example, when the tractor is being used for plowing or soil working purposes, are then removed and in a matter of seconds the stud shaft 26 is slipped into the opening 33 of the coupling 28, the locking member 30 is slipped onto the shaft 26, and the locking pin 31 is clipped into the annular groove 27. The power tool 29 is then pivotally or oscillatably supported on the shaft 26. However, since it is desirable to limit the degree of oscillation to which the power tool may be subjected, a fillister type screw 38 is inserted through the slot 34 and screwed into the opening 39 on the offset hub 13. The head of the screw will be fitted in the slot without binding the same and acts as a limit stop through which oscillation or pivotal action of the power tool can take place, which preferably is in the neighborhood of about 30°. With this arrangement, the power tool will readily adapt and accommodate itself to variations in ground contour as illustrated in Fig. 4 in dotted line position.

When it is desired to prevent oscillation of the tool, or where a type of tool is utilized which is intended to remain fixed, the screw 38 or a similar screw 39', may be inserted through the opening 35 in the coupling 28 and screwed into the threaded opening 40 provided therefor in the off-set hub section 13.

When the tool 29 is so positioned, for example, to oscillate, the same is powered by means of a pulley 41. Such a pulley is mounted on a shaft in a gear box 42 containing suitable bevel gears (not shown) acting as a further power take-off device to rotate a pulley 43. The pulley 43 in turn rotates another pulley 44 through a belt 45 and rotates a shaft 46, on the other end of which is mounted a rotatable tool (not shown).

The pulley 41 is driven by means of a belt 47 passing between yoke sections 14 and 15 of the adapter frame.

In addition to the important features of the tool being able to accommodate itself to variations in ground contour, it will be observed that a further important feature has been provided by the coaxial positioning of the stud shaft 26 with the power take-off shaft 24. With this arrangement, idlers, springs, special belts and automatic adjustments have been eliminated insofar as the driving belt 47 is concerned. That is, this belt 47 being mounted on one of the pulleys 25 on the shaft 24 which is in coaxial alignment with the stud 26 permits oscillation of the tool without any variations of tension on the belt. Once the proper belt adjustment is made, it will remain so regardless of the position of the tool.

It should be understood that the invention herein described is not necessarily limited for use with a garden tractor having a plurality of change-speed pulleys as shown in the drawings, but is equally applicable to such tractors of the more economical type wherein a single pair of pulleys are provided to give a constant speed.

It will thus be seen that the objects hereinbefore set forth may readily and efficiently be attained, and since certain changes may be made in the above construction and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention what I claim as new and desire to secure by Letters Patent is:

1. In a quick-change power tool coupling device, for a tractor having a longitudinal driving shaft with driven pulleys at its forward end and a driving motor with driving pulleys connecting the driven pulleys by a belt, the improvement comprising a first coupling member constituting a housing for said driving and driven pulleys which comprises a transverse front panel spaced longitudinally forwardly of said driving shaft and provided with a flat abutment bearing surface on the forward face thereof; a rearwardly extending frame secured to said first coupling member and terminating in a yoke secured to said tractor to thereby support said panel transversely in front of said driving shaft and said driving and driven pulleys; a single, fixed stud shaft extending normally from the front face of said panel and integral therewith but in spaced-apart coaxial alignment with said driving shaft with said panel intervening therebetween; a second coupling member of a power tool having a bearing opening therein and pivotally received by said stud shaft in abutting relation to said surface to thereby oscillatably mount said tool to adapt it to accommodate itself to variations in ground contour as the tool is operated in advance of said tractor; a power take-off on said tool; driving means connecting said driven pulley with said power take-off and said tool to operate the latter; means cooperatively connecting said coupling members to control the degree of oscillation of said tool; and means to maintain said tool in position to oscillate on said stud shaft.

2. In a quick-change power tool coupling device, for a tractor having a longitudinal driving shaft with driven pulleys at its forward end and a driving motor with driving pulleys connecting the driven pulleys by a belt, the improvement comprising; a first coupling member constituting a housing for said driving and driven pulleys which comprises a transverse front panel spaced longitudinally forwardly of said driving shaft provided with a flat abutment bearing surface on the forward face thereof; a rearwardly extending frame secured to said first coupling member and terminating in a yoke secured to said tractor to thereby suspend said panel transversely in front of said driving shaft and said driving and driven pulleys; a single, fixed stud shaft extending normally from the front face of said panel and integral therewith but in coaxial spaced-apart alignment with said driving shaft; a second coupling member of a power tool having a bearing opening therein and pivotally received by said stud shaft in abutting relation to said surface to thereby oscillatably support said tool as it follows variations in ground contour as the tool is operated in advance of said tractor; a power take-off on said tool; driving means connecting said driven pulley with said power take-off and said tool to operate the latter; means, including an arcuate slot in said second coupling member adjacent said bearing opening and on the same diameter, and a limit stop member connected to said panel and projecting into said slot to control the degree of oscillation of said tool; and means to maintain said tool in position to oscillate on said stud shaft.

3. In a quick-change power tool coupling device, for a tractor having a longitudinal driving shaft with driven pulleys at its forward end and a driving motor with driving pulleys connecting the driven pulleys by a belt, the improvement comprising; a first coupling member constituting a housing for said driving and driven pulleys which comprises a transverse front panel spaced longitudinally forwardly of said driving shaft provided with a flat abutment bearing surface on the forward face thereof; a rearwardly extending frame secured to said first coupling member and terminating in a yoke secured to said tractor to thereby hold said panel transversely in front of said driving shaft and said driving and driven pulleys; a single, fixed stud shaft extending normally from the front face of said panel and integral therewith but in coaxial spaced-apart alignment with said driving shaft, and having an annular groove adjacent its outer end; a second coupling member of a power tool having a bearing opening therein and pivotally received by said stud shaft in abutting relation to said surface to thereby oscillatably mount said tool in order that it can accommodate itself to variations in ground contour as the tool is operated in front of said tractor; a power take-off on said tool; driving means connecting said driven pulley with said power take-off and said tool to operate the latter; means cooperatively connecting said coupling members to control the degree of oscillation of said tool; means, including a sleeve member on said stud shaft between said second coupling member and said annular groove; and a clip-on locking element clipped into said groove to maintain said tool in position to oscillate on said stud shaft.

4. In a hitch rapidly to interchange a plurality of power tools for a tractor having a longitudinal driving shaft with driven pulleys at its forward end and a driving motor with driving pulleys connecting the driven pulleys by a belt; the improvement comprising; a first coupling member constituting a housing for said driving and driven pulleys which includes a transverse front panel spaced longitudinally forwardly of said driving shaft having a rearwardly extending frame secured to said first coupling member and terminating in a yoke secured to said tractor to thereby hold said panel transversely in front of said driving shaft and said driving and driven pulleys; a single bearing hitch member fixedly extending normally from the front face of said panel and in coaxial but spaced-apart alignment from said driving shaft; a second coupling member of a power tool also having a single bearing hitch member pivotally connected to said first bearing hitch member, whereby said tool is oscillatably supported to accommodate itself to variations in ground contour as the tool is operated in advance of said tractor; a power take-off on said tool; driving means connecting said driven pulley with said power take-off and said tool to operate the latter; means cooperatively connecting said coupling members to control the degree of oscillation of said tool; and means to maintain said tool in position on said first bearing member as the same is oscillating.

References Cited in the file of this patent

UNITED STATES PATENTS

| | | |
|---|---|---|
| 2,201,420 | Zschau | May 21, 1940 |
| 2,368,290 | Donald | Jan. 30, 1945 |
| 2,466,594 | Kelsey | Apr. 5, 1949 |
| 2,615,759 | Becker | Oct. 28, 1952 |
| 2,676,447 | Asbury | Apr. 27, 1954 |